United States Patent
Fornage et al.

(10) Patent No.: US 9,583,255 B2
(45) Date of Patent: Feb. 28, 2017

(54) SURGE BLOCKING INDUCTOR

(71) Applicant: Enphase Energy, Inc., Petaluma, CA (US)

(72) Inventors: Martin Fornage, Petaluma, CA (US); Arash Nejadpak, Grand Forks, ND (US)

(73) Assignee: Enphase Energy, Inc., Petaluma, CA (US)

( * ) Notice: Subject to any disclaimer, the term of this patent is extended or adjusted under 35 U.S.C. 154(b) by 155 days.

(21) Appl. No.: 14/290,008

(22) Filed: May 29, 2014

(65) Prior Publication Data

US 2014/0268944 A1  Sep. 18, 2014

Related U.S. Application Data

(63) Continuation-in-part of application No. 14/034,051, filed on Sep. 23, 2013, now abandoned.

(60) Provisional application No. 61/703,865, filed on Sep. 21, 2012.

(51) Int. Cl.

| | |
|---|---|
| *H02H 1/00* | (2006.01) |
| *H01F 27/34* | (2006.01) |
| *H01F 27/28* | (2006.01) |
| *H02M 1/32* | (2007.01) |
| *H02H 1/04* | (2006.01) |
| *H02H 9/04* | (2006.01) |
| *H02H 7/12* | (2006.01) |
| *H02H 9/00* | (2006.01) |

(52) U.S. Cl.
CPC ......... *H01F 27/343* (2013.01); *H01F 27/288* (2013.01); *H02H 1/04* (2013.01); *H02H 9/04* (2013.01); *H02M 1/32* (2013.01); *H02H 7/12* (2013.01); *H02H 9/007* (2013.01)

(58) Field of Classification Search
USPC .................................................. 361/117–120
See application file for complete search history.

(56) References Cited

U.S. PATENT DOCUMENTS

| | | | |
|---|---|---|---|
| 2,901,636 A * | 8/1959 | Torrey | H03K 3/45 307/416 |
| 4,563,720 A | 1/1986 | Clark | |
| 5,617,284 A | 4/1997 | Paradise | |
| 5,737,161 A | 4/1998 | Thomas | |
| 2008/0246459 A1 | 10/2008 | Ingman | |

(Continued)

FOREIGN PATENT DOCUMENTS

| | | |
|---|---|---|
| EP | 350916 B1 | 1/1994 |
| JP | 10066254 A | 3/1998 |

OTHER PUBLICATIONS

"C62.41-1980 Guide for Surge Voltages in Low-Voltage AC Power Circuits", ANSI/IEEE, 1981.

(Continued)

*Primary Examiner* — Danny Nguyen
(74) *Attorney, Agent, or Firm* — Moser Taboada (57) ABSTRACT

A surge blocking inductor. In one embodiment, the surge blocking inductor includes a core; a first winding wound about the core in a first direction; and a second winding wound about the core in a second direction, wherein the first winding and the second winding are magnetically independent when the core is in a non-saturated state, and wherein the first winding and the second winding are coupled magnetically when the core is in a saturated state.

17 Claims, 5 Drawing Sheets

(56) References Cited

U.S. PATENT DOCUMENTS

2013/0069615 A1* 3/2013 Choi ..................... H02M 1/44
                                                                                             323/304

OTHER PUBLICATIONS

Lloyd H. Dixon, Jr. "Eddu Current Losses in Transformer Windings and Circuit Wiring", Texas Instruments Incorporated, 13 pages, 2003.

"ER41/7.6/32 Data Sheet Planar ER cores and accessories", Ferroxcube, 4 pages, Sep. 1, 2008.

International Search Report and Written opinion Mailed Jan. 23, 2014 for Application No. PCT/US2013/061185, 12 pages.

* cited by examiner

SURGE BLOCKING INDUCTOR

CROSS-REFERENCE TO RELATED APPLICATIONS

This application is a continuation-in-part application that claims the benefit of U.S. utility patent application Ser. No. 14/034,051 filed on Sep. 23, 2013, that claims benefit of U.S. provisional patent application Ser. No. 61/703,865, filed Sep. 21, 2012, which are herein incorporated in their entirety by reference.

BACKGROUND OF THE INVENTION

Field of the Invention

Embodiments of the invention generally relate to power conversion and, more particularly, to power converter surge protection.

Description of the Related Art

Power converters connected to an AC power grid are required via government standards to survive power surges from the grid-side and thus must survive both simulated lightning strikes as well as real ones. A typical standard that must be met by such power converters is ANS1 C62.41. To meet the standard, a power converter must handle a voltage amplitude as high as 6000 v, open circuit, and a current amplitude as high as 3000 A on a short circuit. In order to survive these simulated surges, power converters must either survive the 6000 v (which is rarely feasible) or dissipate the energy while clamping the voltage to a survivable value.

Typical voltage protection networks used in power conversion involve clamps such as, for example, metal oxide varistor (MOV), Zener and other solid state devices.

Figure 1:
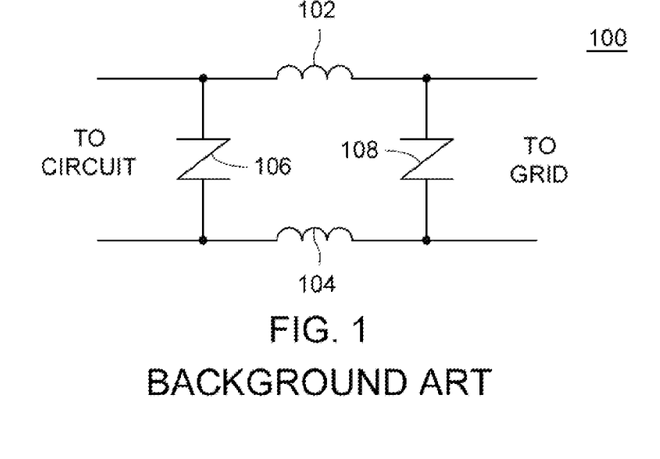
FIG. 1 depicts a schematic of a background art ladder network used for surge protection.

FIG. 1 depicts a schematic diagram of a background art ladder network 100 used for surge protection. The ladder network 100 comprises inductors 102 and 104, and Zener diodes 106 and 108, using the Zener diodes 106 and 108 to form a clamp. The inductor 102 is coupled across first terminals of the Zener diodes 106 and 108, and the inductor 104 is coupled across second terminals of the Zener diodes. The Zener diode 106 is coupled across a circuit, such as a power converter, and the Zener diode 108 is coupled to a power grid.

Figure 2:
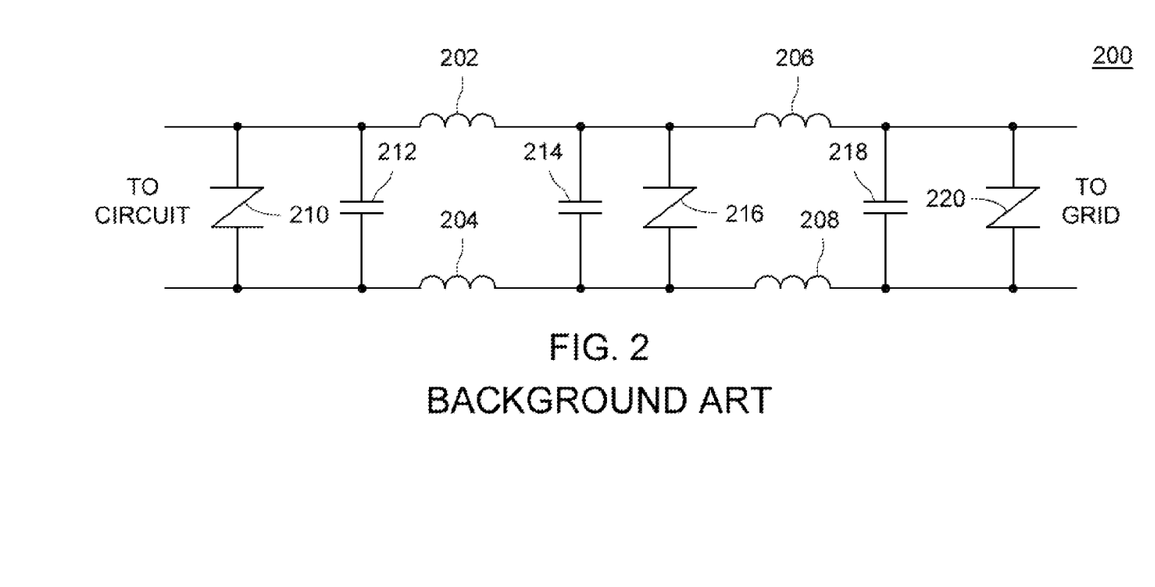
FIG. 2 depicts a schematic of a background art multistage ladder network used for surge protection.

FIG. 2 depicts a schematic diagram of a background art multistage ladder network 200 used for surge protection. The multistage ladder network 200 is a protection network having multiple stages and additional filtering capacitors with respect to the ladder network 100. The protection network 200 comprises inductors 202, 204, 206, and 208; capacitors 212, 214, and 218; and Zener diodes 210, 216, and 220. The inductor 202 is coupled across first terminals of the Zener diodes 210 and 216, and the inductor 204 is coupled across second terminals of the Zener diodes 210 and 216. The inductor 206 is coupled across first terminals of the Zener diodes 216 and 220, and the inductor 208 is coupled across second terminals of the Zener diodes 216 and 220. The capacitors 212, 214, and 218 are coupled in parallel across the Zener diodes 210, 216, and 220, respectively. The Zener diode 210 is coupled across a circuit, such as a power converter, and the Zener diode 220 is coupled to a power grid. The inductors in each of FIGS. 1 and 2 (i.e., inductors 102, 104, 202, 204, 206, and 208) can be common mode, differential mode or a mix. They help reduce the stress on the clamps by reducing the flow of energy. However, these inductors are generally wound on a core such as ferrite, powdered magnetic iron, and the like that cannot possibly handle the surge current and saturate quickly, thereby reducing their effectiveness.

In addition, electromagnetic interference (EMI) filtering often requires surge protection in the form of clamping devices (voltage clamping diodes, gas discharge tubes (GDTs), metal oxide varistors (MOVs), and the like). Such clamping devices drive up production costs and increased components mean less reliability with more points of circuit failure.

Therefore, there is a need in the art for an improved surge blocking inductor for use in power converters.

SUMMARY OF THE INVENTION

An apparatus for a surge blocking inductor substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

A new inductor structure is created which maximizes the saturated inductance value of the structure. The structure comprises two counter-wound inductors wound on a common core such that the coils are coupled magnetically when the common core is saturated.

Figure 3:
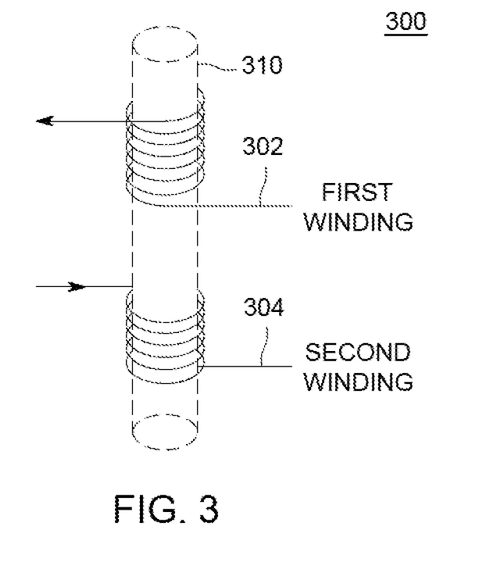
FIG. 3 is an illustration of coil windings in accordance with one or more embodiments of the present invention.

FIG. 3 is an illustration of an inductor assembly 300 in accordance with one or more embodiments of the present invention. The inductor assembly 300 (which may be referred to as "structure 300") comprises a common core 310 (shown in phantom), a first winding 302 (which also may be referred to as coil 302) and a second winding 304 (which also may be referred to as coil 304). The first winding 302 is wound opposite to the second coil 304. The structure 300 is similar to a Helmholtz coil.

In accordance with one or more embodiments of the present invention, the mechanical dimensions of the inductor assembly 300 are optimized in such a way to:

both maximize the inductance and optimize the coupling between the fields of coils 302 and 304 when the core 310 is in a saturated state;

maximize the winding losses at higher frequencies;

obtain the desired inductive value in a non-saturated state for proper electromagnetic interference (EMI) filtering in normal operation.

Mechanical dimensions of the inductor assembly 300 are dependent on current requirements and may range, for example, from 10 millimeters (mm) to 300 mm. In some embodiments, the inductor assembly 300 may have a diameter on the order of 40 mm and a total height on the order of 24 mm.

When operating in a non-saturated state, the coils 302 and 304 operate as two magnetically independent inductors. However, the coils 302 and 304 are positioned (i.e., on top of one another and close to each other) such that when saturated, their corresponding fields couple to one another. By such coupling, the total effect of the coils 302 and 304 when in a saturated state is increased beyond their sum. For example, if the coils 302 and 304 each have an inductance of 10 microhenries (μH), when in a saturated state the total effect may be increased to 40 μH.

In order to maximize the saturated inductance, each coil 302 and 304 has multiple turns around the core 310. Each coil 302 and 304 is wound to have multiple layers with few turns/layer; in some embodiments, each coil 302 and 304 may have between 3-10 layers with a number of turns per layer less than its number of layers, such as only one turn per layer (i.e., a pancake winding). Such a structure of the inductor assembly 300 has maximum blocking capability with very high current going through it.

The losses for the inductive assembly 300 are dependent upon the number of coil layers on top of one another. As such, the structure of the inductor assembly 300 results in a high resistance $R_{ac}$ (for example, a $R_{ac}/R_{dc}$ ratio may be higher than 10 in certain embodiments) of each coil 302 and 304, thereby dissipating significant amounts of energy in the coils themselves. The inductor assembly 300 thus both blocks as well as dissipates energy due to surges.

The inductor assembly 300 may also be used in a filter for EMI frequencies. The high $R_{ac}$ of the inductor assembly 300 helps dampen resonances of the EMI filter; as such, the Q-factor can be reduced at the desired frequency.

In addition to providing the surge protection and EMI filtering previously described, the inductor assembly 300 allows the energy being propagated all the way through the system to be used to reduce the voltage rating on switches used in some devices that employ the inductor assembly 300. In some embodiments, power converters may be able to use 650V switches rather than 800V switches when utilizing the inductor assembly 300, thus providing cost as well as efficiency savings.

Figure 4:
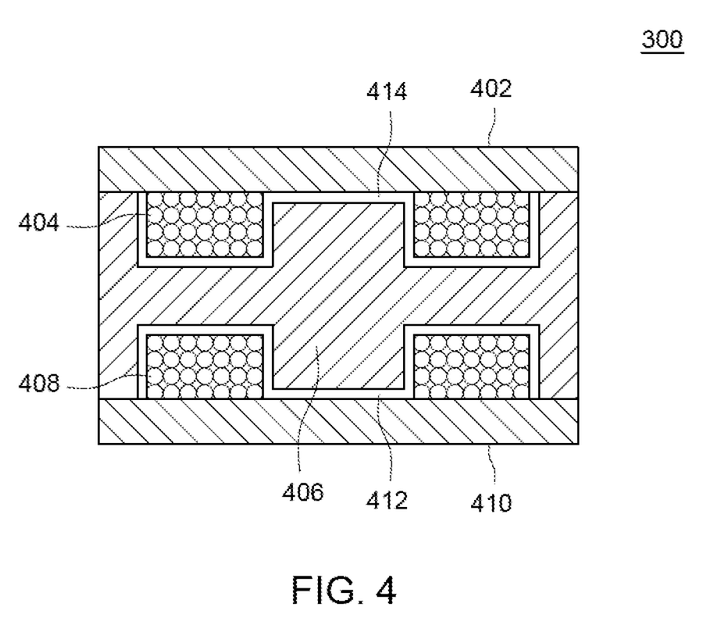
FIG. 4 is a cross-sectional view of a surge blocking inductor in accordance with one or more embodiments of the present invention.

FIG. 4 is a cross-sectional view of another embodiment of the inductor assembly 300 in accordance with one or more embodiments of the present invention. As depicted in FIG. 4, the inductor assembly 300 comprises a first plate 402, a first coil 404, a core center section 406, a second coil 408 and a second plate 410. The core center section 406 and plates 402 and 410 are made of a ferromagnetic material, such as Mn—Zn ferrite or Ni—Zn ferrite, or powdered iron alloys or the like. A gap 414 is formed between the center of the core center section 406 and the first plate 402, and a gap 412 is formed between the center of the core center section 406 and the second plate 410. In some embodiments, each of the gaps 414 and 412 may be half-way through the corresponding winding. Each gap 414 and 412 may be on the order of 0.1 to 5 mm range depending on the desired non-saturated inductance value. The gaps 414 and 412 are air gaps located in this embodiment as along the sides of the coils 404 and 408. Further embodiments include air gaps located in the middle of the respective primary and secondary coils. As will be discussed further below with respect to FIG. 5, alternative embodiments include an additional surge blocking layer.

In some embodiments, the core center section 406 may be formed from a single piece of ferromagnetic material. In other embodiments, the core center section 406 may be formed from a plurality of pieces of ferromagnetic material. For example, two cores (such as planar cores) may be stacked on top of each other to form the core center section 406. The inductor assembly 300 may have four identical or similar half core pieces stacked on top of each other.

The magnetic path is independent for the first and second coils 404 and 408; however, the center section (i.e., the core center section 406) can be shared between both halves. Each magnetic path consists of the core center section 406, a gap 412 or 414, and a plate 402 or 414.

The coils 402 and 404 each are wound with a large center diameter in order to maximize the saturated inductance (i.e., air core) value; the center diameter may be on the order of 15 mm in some embodiments. The windings are narrow but have many layers, for example between 3 to 10 layers, in order to increase and optimize the losses at higher frequencies (e.g., 10 kHz or greater) through proximity effects (i.e., eddy currents).

The high layer count (for example, 5 or more) for each of the coils 402 and 404 multiplies the effective resistance of the corresponding coil at higher frequencies. This further reduces the energy going through the corresponding coil and dampens the EMI filter, making it less resonant at its natural frequency. Additionally, the high layer count for each of the coils 402 and 404 reduces the intra-winding capacitance, thereby increasing the self-resonance frequency of the corresponding coil (i.e., the corresponding inductor).

The structure 300 also improves the voltage handling capability of each of the coils 402 and 404 by reducing the maximum electric field in the structure 300 during surges. Given that magnet wire has limited voltage withstand capabilities, a higher number of layers in each of the coils 402 and 404 will increase the breakdown voltage across the winding. In some embodiments, the layers may have only one turn each yielding a pancake winding.

The structure 300 provides both common mode and differential mode inductance to provide both EMI suppression and surge protection. Such an inductor structure 300 may be used between a circuit (e.g., a power converter) and the AC power grid.

Figure 5:
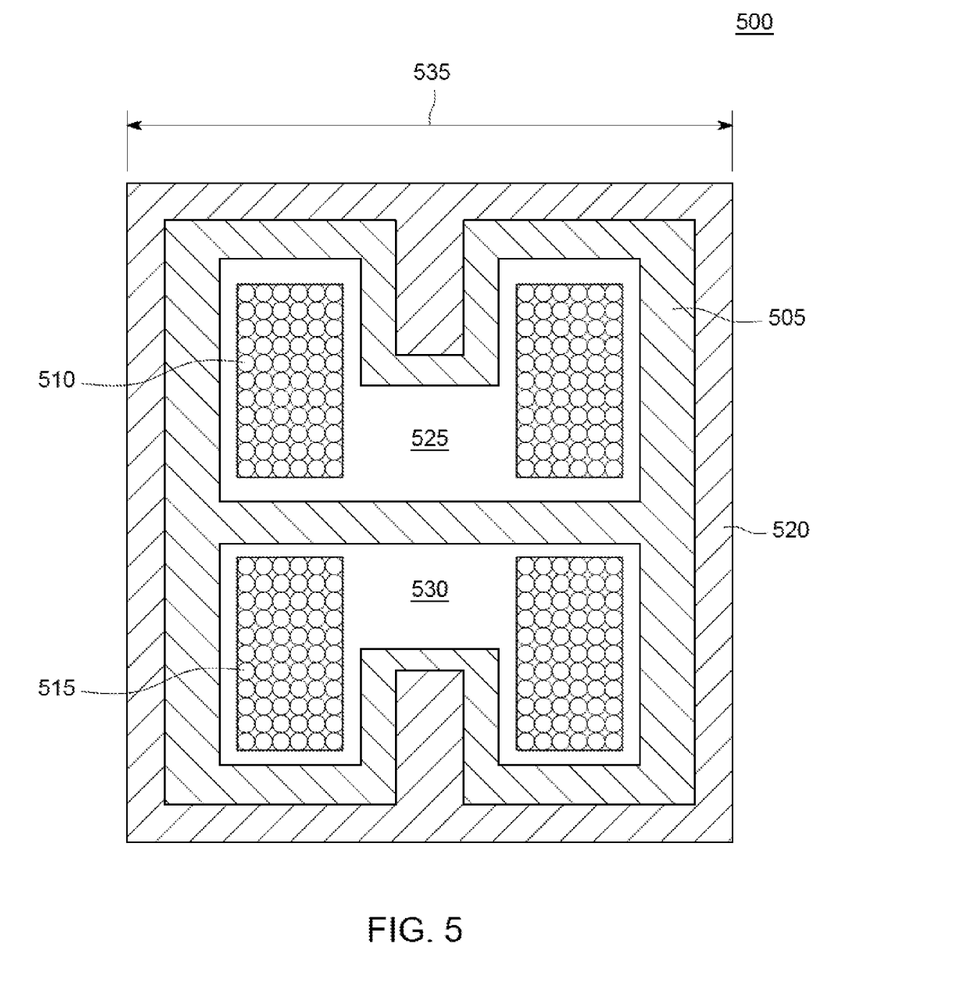
FIG. 5 is a cross-sectional view of a shielded surge blocking inductor in accordance with one or more embodiments of the present invention.

FIG. 5 is a cross-sectional view of a shielded surge blocking inductor 500 in accordance with one or more embodiments of the present invention. The shielded surge blocking inductor 500 comprises a primary coil 510, a secondary coil 515, each surrounded by respective air gaps 525 and 530, a core material 505, and a shield layer 520. In the depicted embodiment, the air gaps 525 and 530 surround the primary and second coils 510 and 515. In alternative embodiments, the air gaps 525 and 530 may partially surround the coils as disclosed above with respect to FIG. 4.

The shield layer 520 encases the core material 505 and coils 510 and 515. In some embodiments, the shield layer 520 completely encases the core material 505 and coils 510 and 515. In other embodiments the shield layer 520 surrounds the periphery of the core material 505 and coils 510 and 515.

In some embodiments, the core material 505 may be flexible (e.g., TODA KOGYO FLX-221, MARUWA MN95, TDK FK2, and the like) or rigid (e.g., FERROXCUBE, TDK N95, and the like) ferrite cores. The shield layer 520 is a thin conductive material and in some embodiments may comprise a copper alloy or aluminum alloy (e.g., 1100 alloy, 6061-T6 alloy, and the like). For example, the thickness of the shield material can be from 0.05 mm to 2 mm.

In the depicted embodiment, the shielded surge blocking inductor 500 comprises a diameter 535 (e.g., diameter can vary from 30 millimeters (mm) to 100 mm, depending on the inductance values and desired application). Mechanical dimensions of the shielded surge blocking inductor 500 are dependent on current requirements and may range, for example, from 30 mm to 100 mm. In some embodiments, the shielded surge blocking inductor 500 may have a diameter on the order of 40 mm and a total height on the order of 20 mm.

The shield layer 520 adds greater energy dissipation capability to the inductor circuitry comprising the primary coil 510, secondary coil 515, and core material 505. In some embodiments the shield layer 520 may encase the inductor assembly 300 to add similar dissipation capability to its inductor circuitry. In other embodiments, the shield layer may be used with other types of devices that possess electromagnetic properties (e.g., Magnetic steel, Aluminum, Copper, Brass and the like).

In normal operation (i.e., non-surge conditions), a magnetic field passes through the core material 505. In a surge condition operation, a high amount of surge current $I_{SURGE}$ would saturate the core material 505, and penetrate to the shield layer 520. For example, the surge current $I_{SURGE}$ may be 500 A with a frequency greater than 12 kHz. A majority of the penetrated energy (e.g., more than 60%) subsequently dissipates on the shield layer 520. The penetrated energy would otherwise have passed through to the rest of the circuit coupled to the primary coil 505 and secondary coil 510.

In the surge condition, the shielded surge blocking inductor 500 will have a resistance for example, about thirty times greater than that of the normal operation condition, thus helping to dissipate the surge power. This is due in part from energy surges occurring at high frequencies (e.g., 12 kHz) and inherent operation of inductors for blocking high frequencies. For example, the resistance (e.g., DC resistance) increases substantially from normal operation at about 116 milliohms (mΩ) to high-frequency resistance (i.e., during surge incidents) of about 3.57 ohms (Ω). Thus, the shielded surge blocking inductor 500 also passively provides high resistance against high frequency energy surges.

Figure 6:
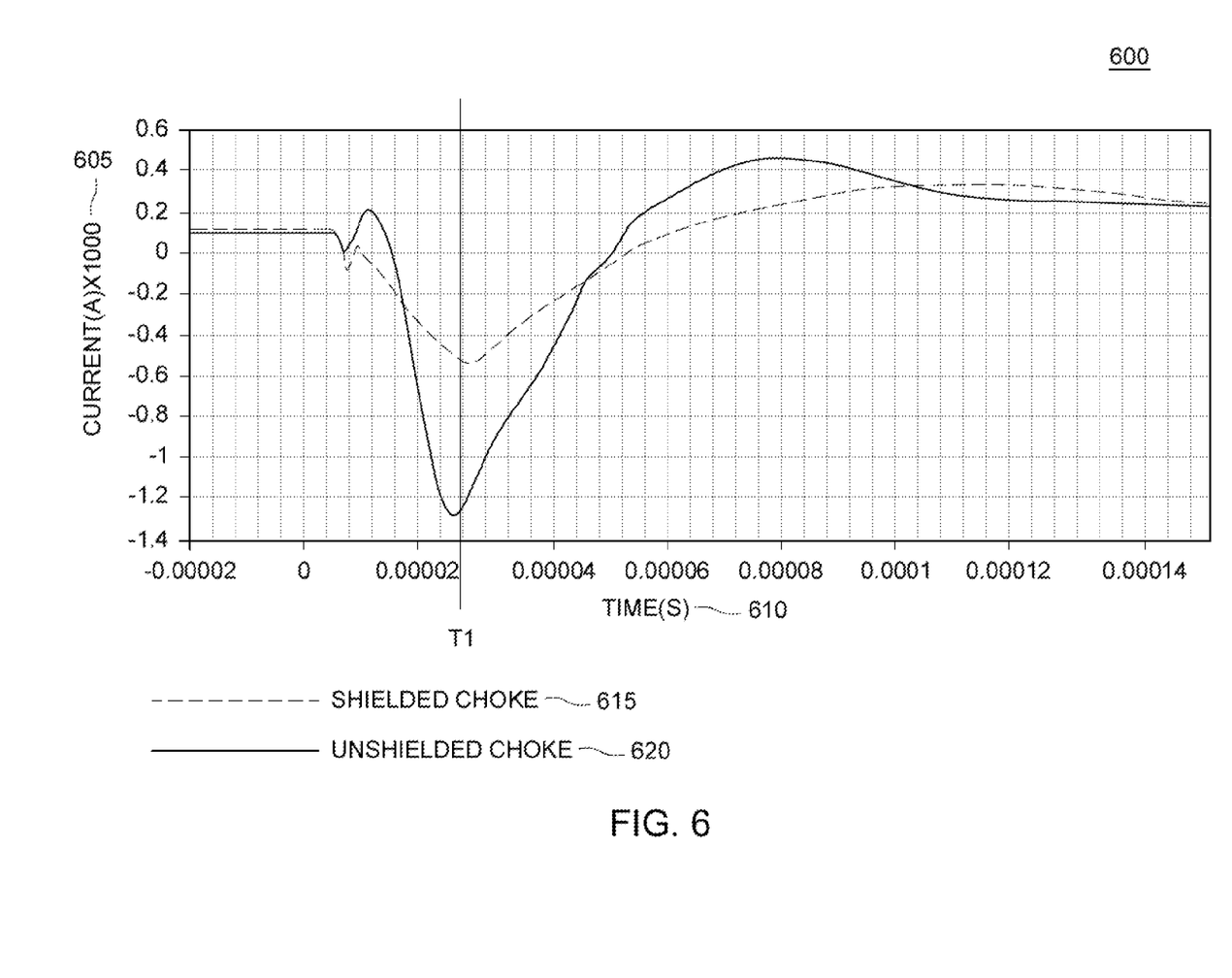
FIG. 6 is an exemplary graph comparing effectiveness of a shielded and unshielded inductor.

FIG. 6 is an exemplary graph 600 comparing effectiveness of a shielded and an unshielded inductor. The graph 600 comprises a plot of comparative current suppression results for the unshielded inductor (e.g., unshielded components 505, 510, and 515) represented by line 620 against that of line 615 representing a shielded inductor (e.g., shielded surge blocking inductor 500) in time 610 versus current 605.

From the graph 600, a comparison of line 615 and line 620 indicates the shielding (e.g., shield layer 520) greatly reduces the amount of surge current experienced at approximately time T1 by dissipating the excess energy. At time T1, surge current at approximately 1300 Amps (A) is reduced to about 580 A. Thus, the shielding dissipates the excess current by more than half.

Figure 7:
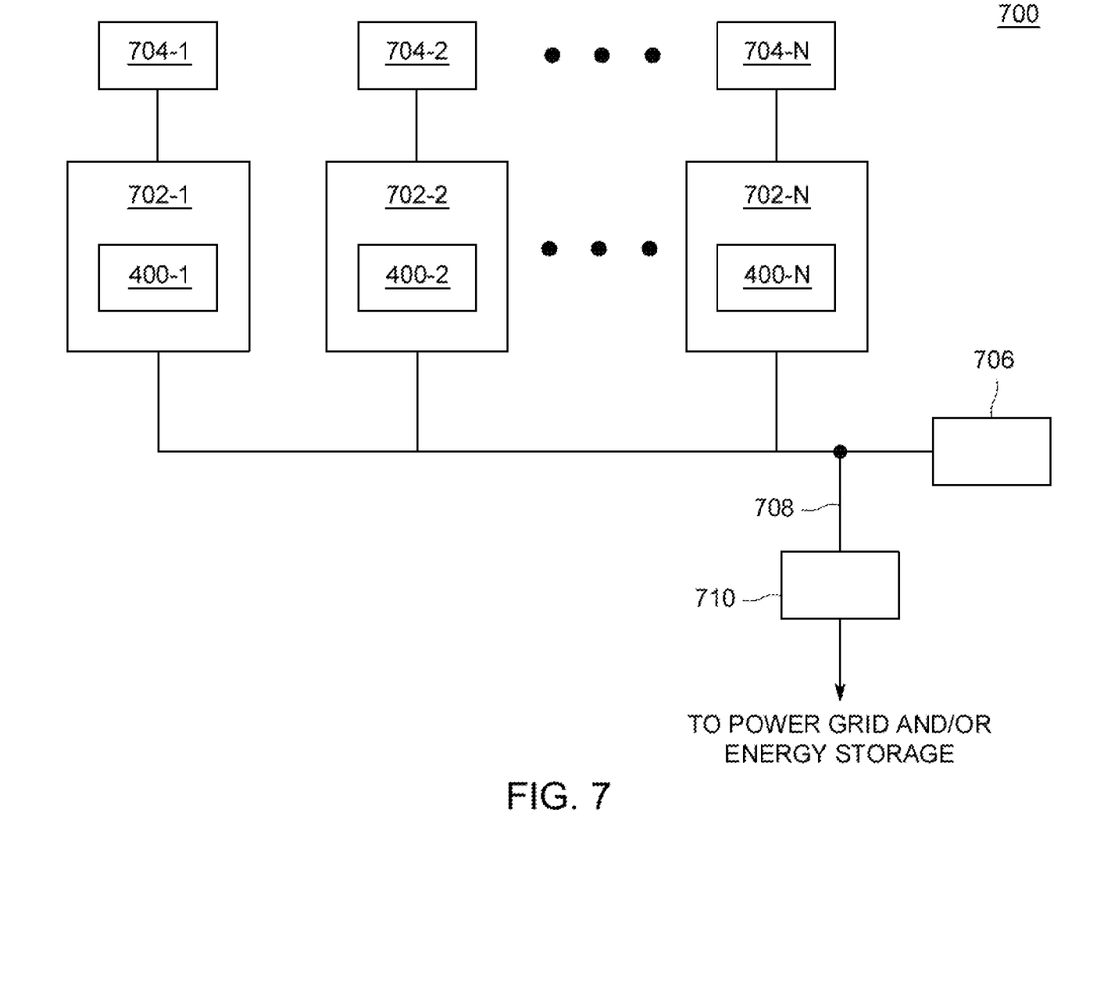
FIG. 7 is a block diagram of a system for power conversion using one or more embodiments of the present invention.

FIG. 7 is a block diagram of a system 700 for power conversion using one or more embodiments of the present invention. This diagram only portrays one variation of the myriad of possible system configurations and devices that may utilize the present invention. The present invention can be utilized in any system or device requiring a surge blocking inductor, for example a resonant converter for converting a DC input power to an output power, such as a DC-DC converter, a DC-AC converter, an AC-AC converter (i.e., as a stage within the AC-AC converter), or the like.

The system 700 comprises a plurality of power converters 702-1, 702-2, 702-3 . . . 702-N, collectively referred to as power converters 702; a plurality of DC power sources 704-1, 704-2, 704-3 . . . 704-N, collectively referred to as DC power sources 704; a controller 706; a bus 708; and a load center 710. The DC power sources 704 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 702-1, 702-2, 702-3 . . . 702-N is coupled to a DC power source 704-1, 704-2, 704-3 . . . 704-N, respectively, in a one-to-one correspondence; in some alternative embodiments, multiple DC power sources 704 may be coupled to a single power converter 702. The power converters 702 are coupled to the controller 706 via the bus 708. The controller 706 is capable of communicating with the power converters 702 by wireless and/or wired communication for providing operative control of the power converters 702. The power converters 702 are further coupled to the load center 710 via the bus 708.

The power converters 702 convert the DC power from the DC power sources 704 to an output power; in some embodiments the output power may be DC output power (i.e., the power converters 702 are DC-DC converters), while in other embodiments the output power may be AC output power (i.e., the power converters 702 are DC-AC converters). The power converters 702 couple the generated output power to the load center 710 via the bus 708. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 702 convert the DC input power to AC power that is commercial power grid compliant and couple the AC power to the commercial power grid via the load center 710.

Each of the power converters 702 comprises an inductor assembly 400 (i.e., the power converters 702-1, 702-2 . . . 702-N comprise the inductor assemblies 400-1, 400-2 . . . 400-N, respectively) between the power converter 702 and the grid for providing surge protection as well as EMI filtering as previously described. In some alternative embodiments, each inductor assembly 400 may be part of a component that is located external to the corresponding power converter 702 (i.e., between the power converter 702 and the grid).

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A surge blocking inductor comprising:
   a core formed from at least one ferromagnetic component;
   a first winding wound about the core in a first direction; and a second winding wound about the core in a second direction, wherein the first winding and the second winding are positioned such that they are (i) magnetically independent when the core is in a non-saturated state, and (ii) coupled magnetically when the core is in a saturated state, wherein the first winding and the second winding obtain an inductive value in the non-saturated state for electromagnetic interference (EMI) filtering.

2. The surge blocking inductor of claim 1, further comprising a shielding layer encasing the core, the first winding, and the second winding.

3. The surge blocking inductor of claim 2, wherein the shielding layer comprises at least one of a copper alloy or an aluminum alloy.

4. The surge blocking inductor of claim 1, wherein when the core is saturated, the first winding and the second winding both block and dissipate energy.

5. The surge blocking inductor of claim 1, wherein coupling between fields of the first winding and the second winding is optimized when the core is in the saturated state.

6. The surge blocking inductor of claim 1, wherein the first winding comprises a first plurality of turns and a first plurality of layers wound in the first direction, and the second winding comprises a second plurality of turns and a second plurality of layers wound in the second direction opposite the first direction.

7. The surge blocking inductor of claim 6, wherein each of the first plurality of layers and the second plurality of layers is between 3-10 layers with a number of turns per layer less than its number of layers.

8. The surge blocking inductor of claim 2, wherein the surge blocking inductor provides a first resistance during normal operation and a second resistance higher than the first resistance upon receiving a current surge.

9. A shielded surge blocking inductor comprising:
a core formed from at least one ferromagnetic component;
a first winding wound about the core in a first direction;
a second winding wound about the core in a second direction, wherein the first winding and the second winding are positioned such that they are (i) magnetically independent when the core is in a non-saturated state, and (ii) coupled magnetically when the core is in a saturated state; and
a shielding layer encasing the core, the first winding, and the second winding, to dissipate excess energy from a current surge, wherein the first winding and the second winding obtain an inductive value in the non-saturated state for electromagnetic interference (EMI) filtering.

10. The shielded surge blocking inductor of claim 9, wherein the shielding layer comprises at least one of a copper alloy or an aluminum alloy.

11. The shielded surge blocking inductor of claim 10, wherein when the core is saturated, the first winding and the second winding both block and dissipate energy.

12. The shielded surge blocking inductor of claim 9, wherein the shielding layer dissipates a majority of surge energy from a surge current that penetrates to the shielding layer, and away from the first winding and the second winding.

13. The shielded surge blocking inductor of claim 9, wherein coupling between fields of the first winding and the second winding is optimized when the core is in the saturated state.

14. The shielded surge blocking inductor of claim 9, wherein the first winding comprises a first plurality of turns and a first plurality of layers, and the second winding comprises a second plurality of turns and a second plurality of layers.

15. The shielded surge blocking inductor of claim 14, wherein each of the first plurality of layers and the second plurality of layers is between 3-10 layers with a number of turns per layer less than its number of layers.

16. The shielded surge blocking inductor of claim 9, wherein the shielded surge blocking inductor provides a first resistance during normal operation and a second resistance higher than the first resistance upon receiving a current surge.

17. A system for blocking surges to a power converter, comprising:
an inverter; and
a shielded surge blocking inductor, coupled to the inverter, comprising (i) a core formed from at least one ferromagnetic component; (ii) a first winding wound about the core in a first direction; (iii) a second winding wound about the core in a second direction, wherein the first winding and the second winding are positioned such that they are (i) magnetically independent when the core is in a non-saturated state, and (ii) coupled magnetically when the core is in a saturated state; and (iv) a shielding layer encasing the core that dissipates a majority of surge energy away from the first winding and the second winding to protect the inverter upon receiving a current surge, wherein the first winding and the second winding obtain an inductive value in the non-saturated state for electromagnetic (EMI) filtering.

* * * * *